United States Patent [19]

Lumley et al.

[11] Patent Number: 5,630,645
[45] Date of Patent: May 20, 1997

[54] SAFETY SEAT TETHER STRAP

[75] Inventors: Michael A. Lumley, Torquay; William Bowtell, Box Hill Ntl., both of Australia

[73] Assignee: Britax Child-Care Products Pty Ltd., Victoria, Australia

[21] Appl. No.: 509,687

[22] Filed: Jul. 31, 1995

[30] Foreign Application Priority Data

Aug. 1, 1994 [AU] Australia .................. PM7154

[51] Int. Cl.⁶ .................................. A47C 1/08
[52] U.S. Cl. .................. 297/250.1; 297/216.11
[58] Field of Search ............... 297/250.1, 216.1, 297/216.11, 254; 296/63, 64

[56] References Cited

U.S. PATENT DOCUMENTS

| 4,681,368 | 7/1987 | Heath et al. | 297/216.11 |
| 5,118,163 | 6/1992 | Brittian et al. | 297/254 X |

FOREIGN PATENT DOCUMENTS

| 605621 | 3/1989 | Australia | |
| 2548983 | 1/1985 | France | 297/250.1 |
| 2712917 | 9/1978 | Germany | 297/250.1 |
| 75015104 | 6/1976 | Netherlands | 297/216.11 |
| 1519793 | 8/1978 | United Kingdom | 297/250.1 |

*Primary Examiner*—Milton Nelson, Jr.
*Attorney, Agent, or Firm*—Davis and Bujold

[57] ABSTRACT

A safety seat 10, for use in a vehicle, where the safety seat 10 comprises a seat portion 19a, a backrest 19 having a head end remote from the seat portion 19a, a first and second mutually spaced anchorage locations 15 and 15a on the head end of the backrest 19, a connector 12 for engagement with a securement point on a vehicle, the connector 12 having a strap opening, a tether strap 11 extending in a loop from the first anchorage location 15, through the strap opening of the connector 12, to a second anchorage location 15a, and a length adjustor 13 or 13a for adjusting the length of the tether strap 11 loop. This provides a tether strap 11 suitable for use with the safety seat 10 in either a rear or forward facing position. Another significant advantage is having the adjuster 13 or 13a in line with the tether strap 11 to significantly reduce the effective length between the backrest 19 and the securement point on the vehicle.

24 Claims, 10 Drawing Sheets 5,630,645

SAFETY SEAT TETHER STRAP

This invention relates to a safety seat tether strap, and in particular to a tether strap suitable for use with a safety seat that can be used in either a forward or rearward facing position in a vehicle.

BACKGROUND OF THE INVENTION

Child safety seats of motor vehicles are well known. They normally comprise either a rear facing seat in which the infant's back is facing the direction of travel of the motor vehicle, or a forward facing seat. The rear facing seat is normally used for infants up to the age of six months, and the forward facing seat is used for infants older than six months.

Both the rear and forward facing seats make use of a tether strap that extends from the head end of the seat to an attachment point that is fixed with respect to the vehicle. This might comprise a parcel shelf, floor panel behind the seat, or a side pillar.

In case of a rear facing seat, it is normal for a pair of straps to extend from either side of the head end of the seat to the rear connection point. However, in the case of a forward facing seat, it is normal for a single strap to be used and the strap extends from the centre of the head end of the seat to the attachment point.

One difficulty with the use of a single strap is the need to have a number of components in line with the strap. These components comprise a length adjusting means, a hook, and a means of attaching the strap to the hook. The use of all of these components adds length to the tether strap, and therefore means that the strap will still be reasonably long even though it is adjusted to its shortest possible length. In some instances, this length is too long for use with the most convenient attachment point in the vehicle.

It is now common for a single support seat to be adapted for use in both the rear and forward facing modes. To date, most of such dual purpose seats have made use of two tether straps, one for when the seat is in a rear facing mode, and one for when the seat is in a forward facing mode. This represents an unnecessary added cost, and also presents the possibility of incorrect installation when the wrong tether strap is used.

SUMMARY OF THE INVENTION

Accordingly, it is an object of this invention to overcome the abovementioned problems, and in particular to provide a single tether strap which may be used in either the rear or forward facing mode, and which also allows for minimum distance between the rear of the seat and the attachment point on the vehicle.

In its broadest form, the invention is a safety seat, for use in a vehicle, comprising a seat portion, a backrest having a head end remote from said seat portion, first and second mutually spaced anchorage locations on said head end of said backrest, a connector for engagement with a securement point on said vehicle, said connector having a strap opening, a tether strap extending in a loop from said first anchorage location, through said strap opening, to said second anchorage location, and adjustment means for adjusting the length of said loop.

A tether strap in accordance with this invention can either extend away from the rear portion of the backrest of the seat as would be the case in a forward facing seat, or may extend away from the forward surface of the rear portion of the seat as would be the case in a rear facing seat.

The adjustment means may comprise either a cam-type strap clamp, or may comprise a three bar slide. The length adjuster may also comprise an in-line length adjuster located on a portion of the tether strap. The use of such adjustment means will allow the length of the tether strap to be reduced so that there is a very short distance between the hook and the rear of the safety seat.

The tether strap may be attached to side walls of the safety seat, or the tether strap may extend across the backrest through apertures in the side walls of the safety seat. In addition, metal brackets may be attached to the backrest or the side walls of the safety seat with the tether strap being attached to the brackets. The metal brackets may have slots or apertures through which the tether strap may locate. The invention will be described in respect of the anchorage locations comprising apertures in the safety seat, such as apertures in the side walls and backrest. However, it should be realised that when reference is made to such an aperture in the safety seat, or any other such aperture, a metal bracket attached to the safety seat may be used instead.

BRIEF DESCRIPTION OF THE DRAWINGS

In order for the invention to be fully understood, preferred embodiments will now be described, however it should be realised that the invention is not to be confined or restricted to the precise details of the described embodiments. The embodiments are illustrated in the accompanying drawings in which.

DESCRIPTION OF THE PREFERRED EMBODIMENT

Figure 1:
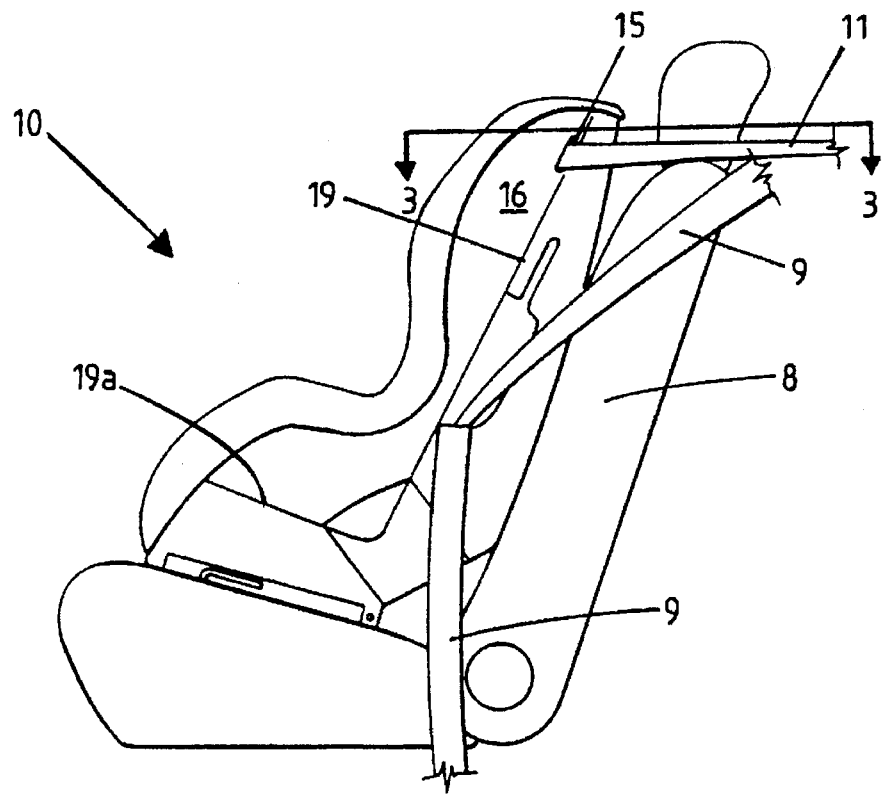
FIG. 1 shows a side view of a safety seat on a vehicle seat in a forward facing position.
Figure 2:
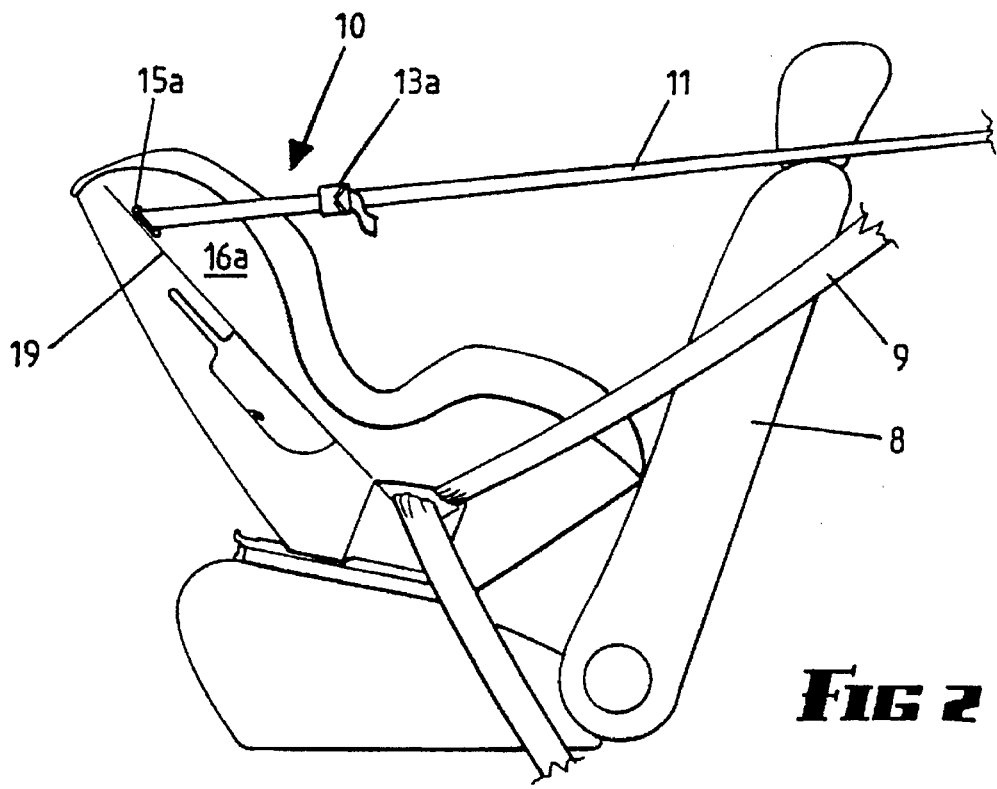
FIG. 2 shows a side view of a safety seat on a vehicle seat in a rearward facing position.

All of the embodiments comprise a tether strap 11, a connector 12 and an adjustment means 13 or 13a. Apertures 15 and 15a are formed in side walls 16 and 16a of a safety seat 10. FIGS. 1 and 2 illustrate the use of a safety seat 10 on a motor vehicle seat 8 in either the forward facing position (FIG. 1) or a rearward facing mode (FIG. 2). The safety seat 10 is held to the vehicle seat 8 by the vehicle seat belts 9.

In each of the embodiments, the safety seat 10 is formed from a unitary moulding which incorporates the side walls 16 and 16a, the backrest 19 and the seat portion 19a. The tether strap 11 extends in a loop between first and second anchorage locations which comprise apertures 15 and 15a respectively that are formed in side walls 16 and 16a. Depending on which of the embodiments is used, other apertures may be formed, and adjustment means 13 may be secured to a portion of the safety seat 10.

Figure 3:
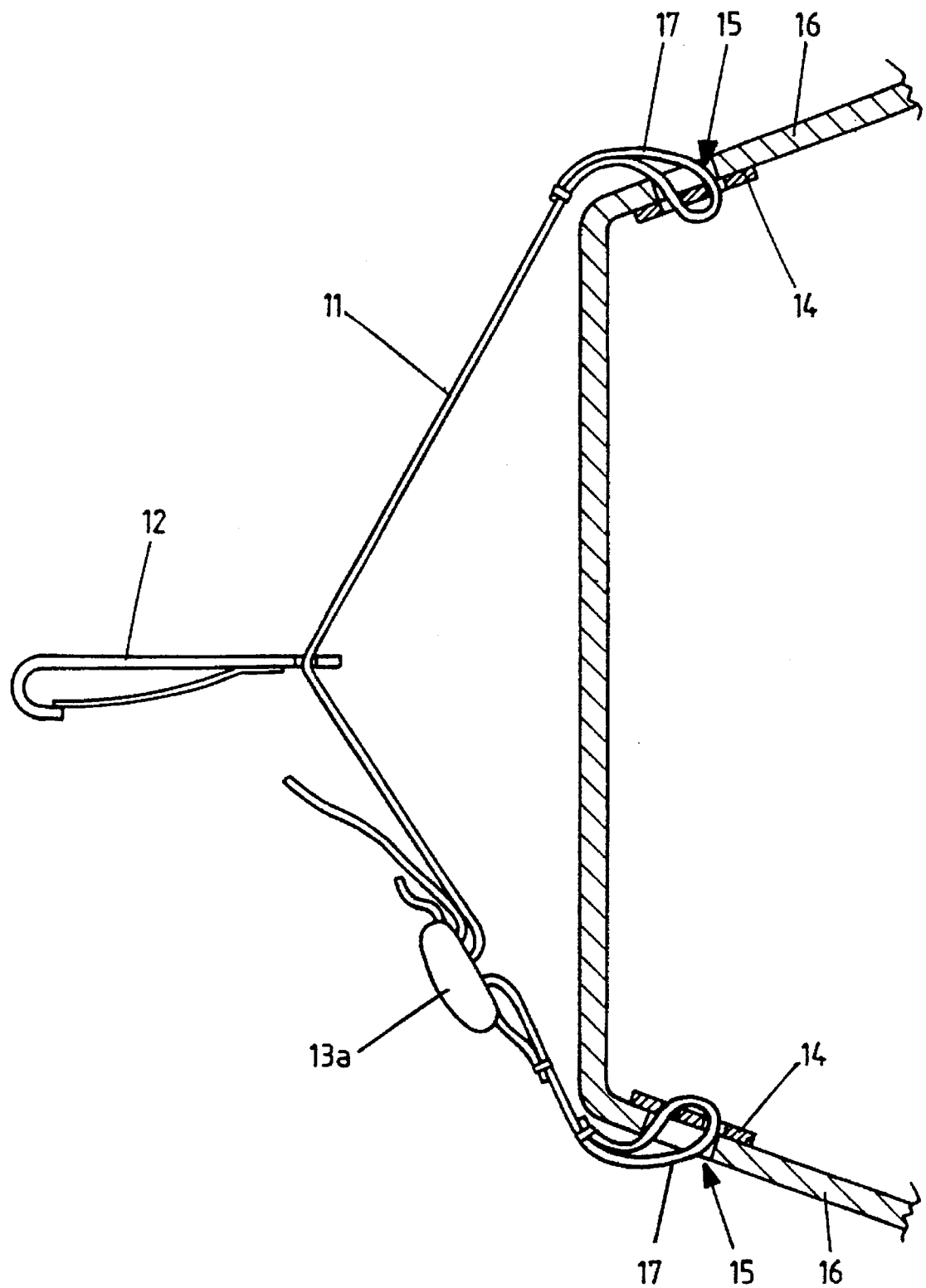
FIG. 3 shows a cross-sectional view of a safety seat along section line 3—3 of FIG. 1.

FIG. 3 shows the simplest form of the invention. An in-line strap adjuster 13a is fitted to the tether strap 11, and loops 17 and 17a are formed in the end of the tether strap 11, and locate through apertures 15 and 15a from the outside surface of the side walls 16 and 16a. The loops 17 and 17a are attached to three bar slides 14 and 14a which abut against the inside surface of the side walls 16 and 16a.

Figure 4:
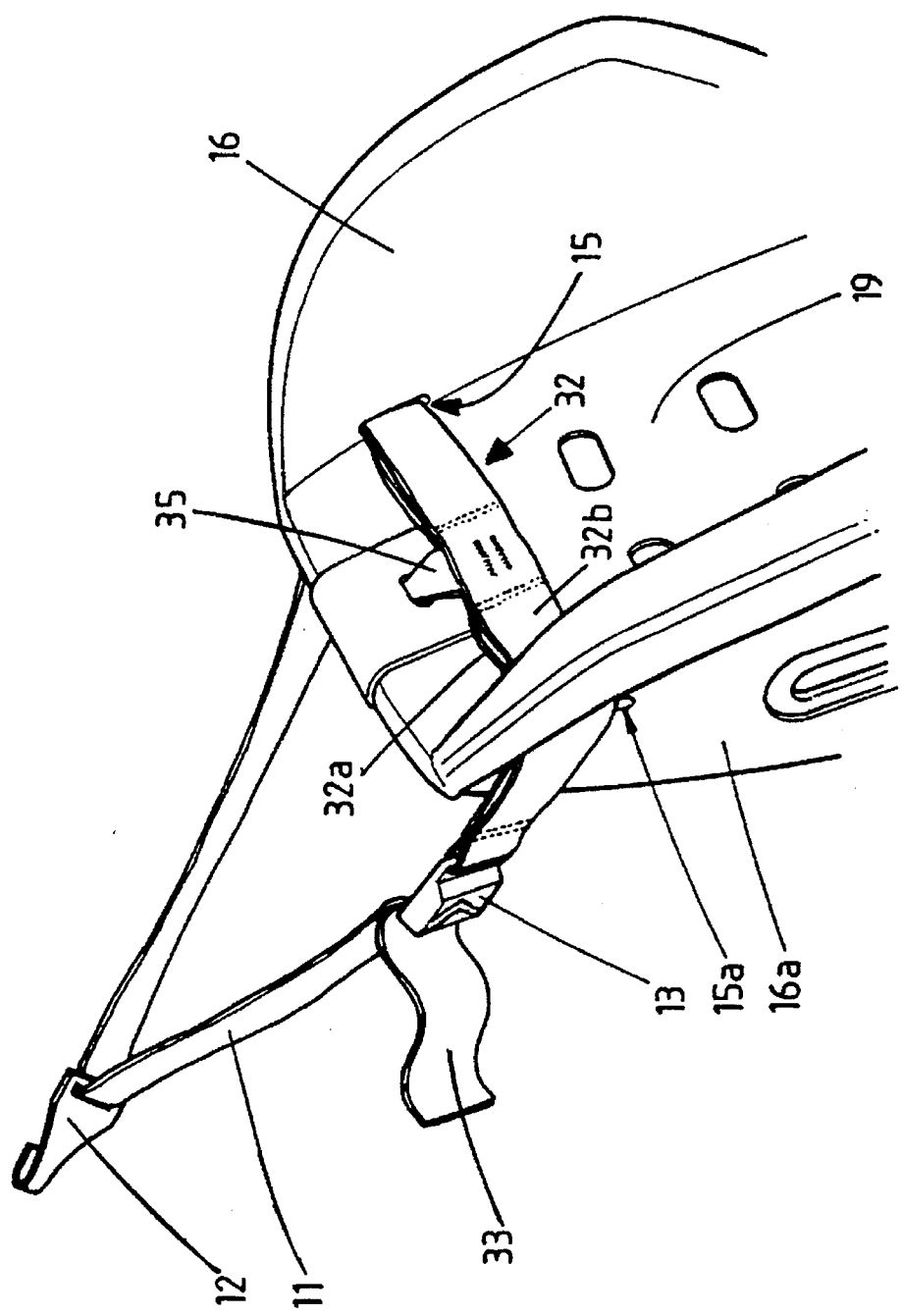
FIG. 4 shows a part perspective view of the head end of a safety seat with attached tether strap.
Figure 5:
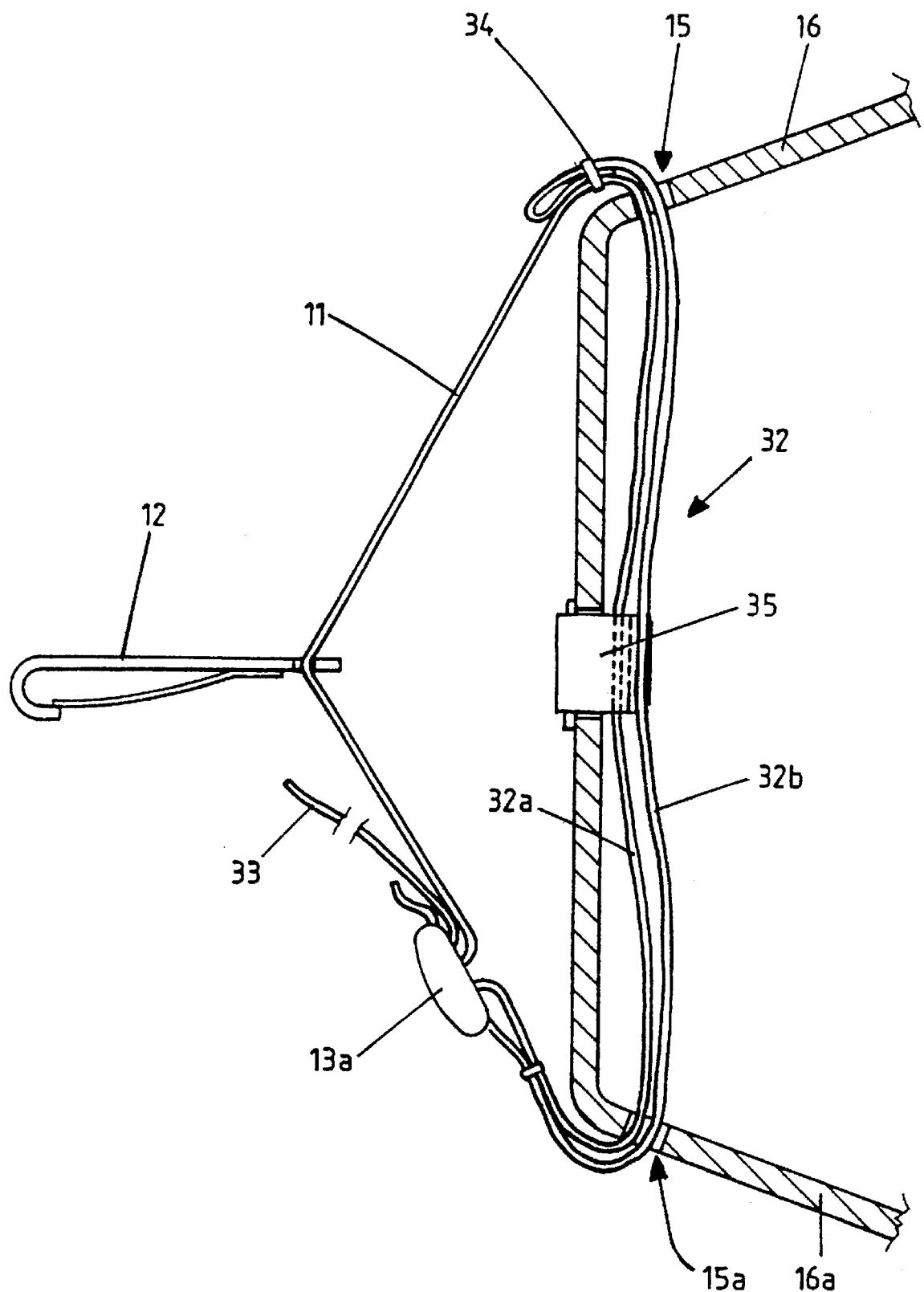
FIG. 5 shows a cross-sectional view similar to FIG. 3 of a second embodiment of a safety seat.

FIG. 4 and FIG. 5 show a safety seat 10 with a tether strap 11 extending through apertures 15 and 15a so that a portion 32 of the tether strap 11 extends between the apertures 15 and 15a between the inside surfaces of the side walls 16 and 16a.

In this embodiment, the adjustment means comprises an in-line adjuster 13a with the first end 33 of the tether strap 11 looped through one side of the in-line adjuster 13a. The end 33 is sufficiently long to enable lengthening of the tether strap 11 from the forward facing mode shown in FIGS. 4 and 5 to a rearward facing mode. The tether strap 11 extends from the in-line adjuster 13a through the strap opening in the connector 12 and through the aperture 15. The tether strap extends through the aperture 15a, loops through the in-line adjuster 13a, and returns back through the aperture 15a and is stitched off via stitching 34. This means that portion 32 is formed from two parallel strap portions 32a and 32b.

In order to hold the portion 32 of the tether strap 11 in place, a strap segment 35 is stitched at one end to both of the strap portions 32a and 32b. The other end of the strap segment 35 is secured to the backrest 19. This prevents movement of the tether strap it with respect to the side walls 16 and 16a and backrest 19.

This arrangement enables the strap to be used with the safety seat in either a forward or rearward facing mode. Sufficient length of the tether strap 11 is provided to enable it to be lengthened in the case of a rearwardly facing seat, or shortened to a very short length when used in a forward facing mode.

Figure 6:
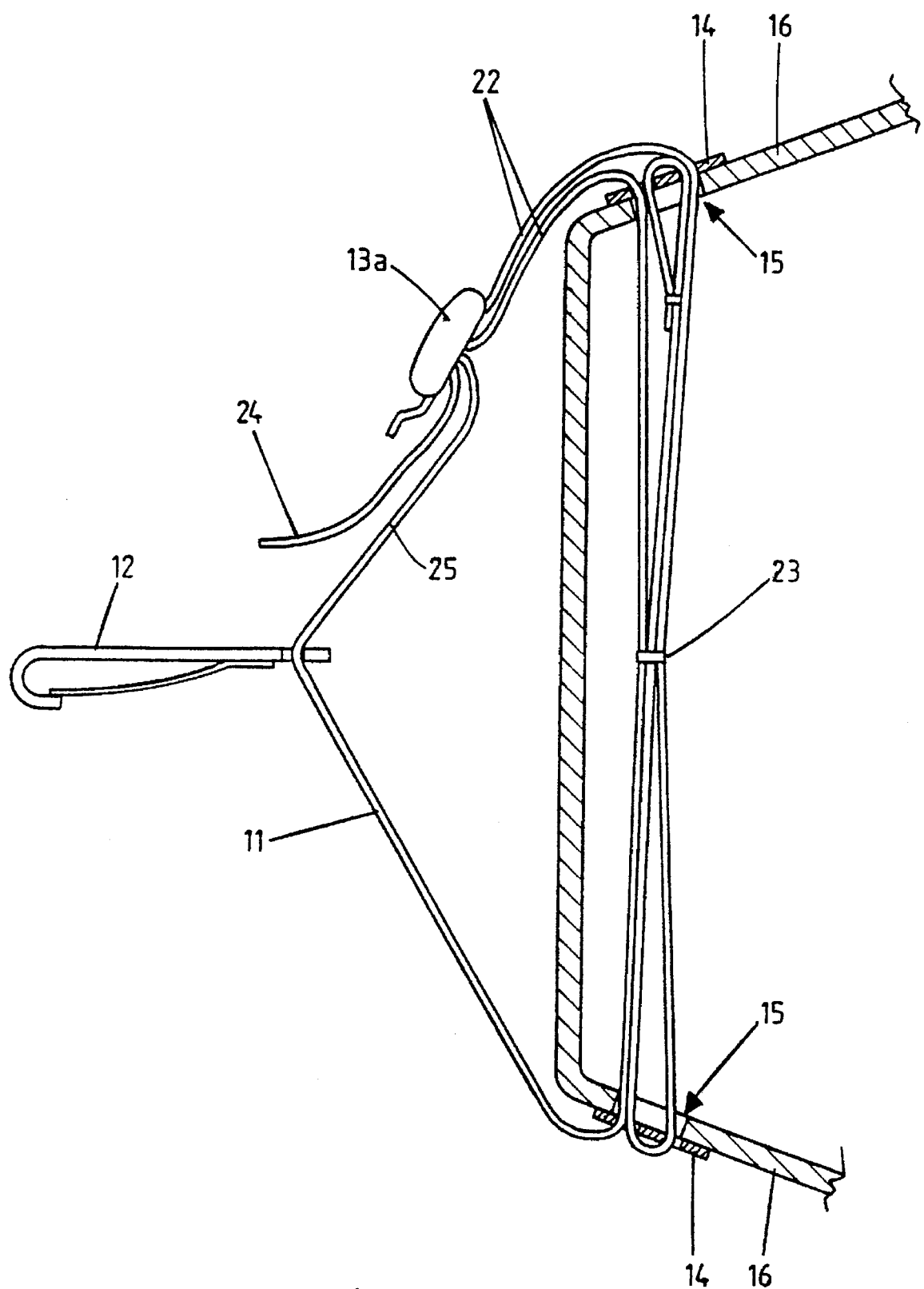
FIGS. 6–11 show a cross-sectional view similar to FIG. 3 of a safety seat with alternative configurations for the tether strap and adjustment means.

FIG. 6 shows the use of an in-line strap adjuster 13a on the tether strap 11 and three bar slides 14 and 14a located on the outside surface of the side walls 16 and 16a. The tether strap 11 extends back and forth between the apertures 15 and 15a. The portions 22 of the tether strap 11 form a loop which is attached to the adjuster 13a. The portions of the tether strap 11 that extend back and forth between apertures 15 are attached to one another via stitching 23.

Adjustment of the tether strap 11 is achieved by pulling the free end 24 through the adjuster 13a which means that only portion 25 of the tether strap 11 moves with respect to the adjuster 13a. The portions of the tether strap 11 that extend between the apertures 15 and 15a do not move during operation of the strap adjuster 13a. Consequently, the three bar slides 14 and 14a are always drawn against the outer surface of the side walls 16 and 16a.

Figure 7:
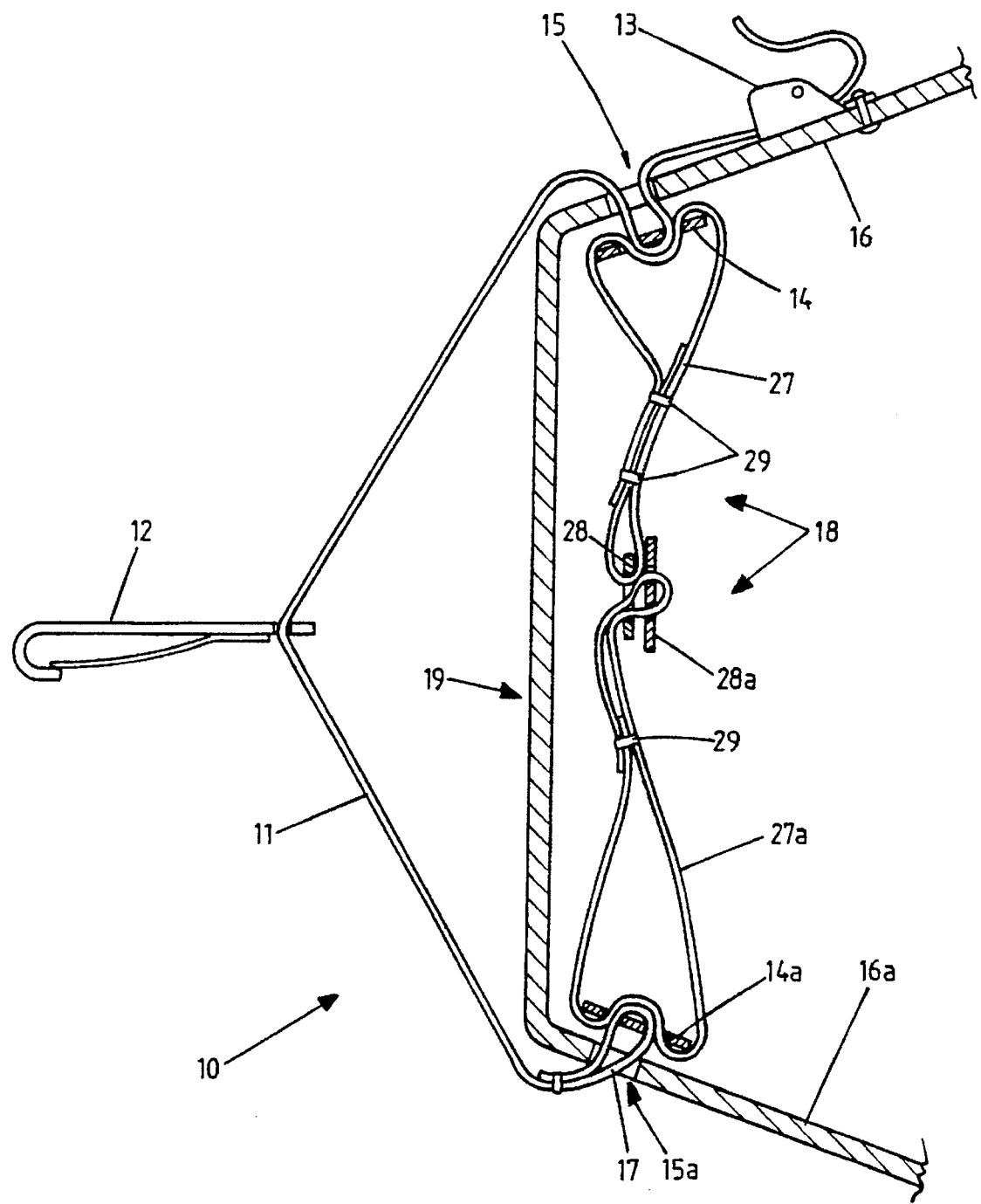

In another embodiment shown in FIG. 7, the adjustment means comprises a cam-type clamp adjuster 13 and is attached to a side wall 16 of the safety seat 10. The tether strap 11 extends from the adjuster 13 through an aperture 15, and the loop of the tether strap 11 is inserted through the centre of a three bar slide 14. A loop 17 is formed in the end of the tether strap 11, and extends through a second aperture 15a in the opposite side wall 16a where it is attached to a second three bar slide 14a. A pair of tensioner straps 18 extend between the two three bar slides 14 and side walls 16. The three bar slides 14 abut against the inside surface of the side wall 16 when the tether strap 11 is tightened, and the tensioner straps 18 provide additional strength under high loads that might occur during impact.

The tensioner straps 18 comprise a pair of loops 27 and 27a. Loop 27 is secured at one end to three bar slide 14 and at the other end to two bar slide 28. Loop 27a has each end secured to three bar slides 14a and 28a. Three bar slide 28a can be inserted through two bar slide 28 to secure the two loops 27 and 27a together. The loops 27 and 27a are a fixed length that are held together by stitching 29. When the tether strap 11 is tensioned, the combined loops 27 and 27a have a small amount of slack remaining to ensure that the three bar slides 14 and 14a bear against the side walls 16 and 16a. However, further tension applied to the tether strap 11 will cause flexing of the side walls 16 and 16a resulting in the loops 27 and 27a being placed under tension.

Figure 8:
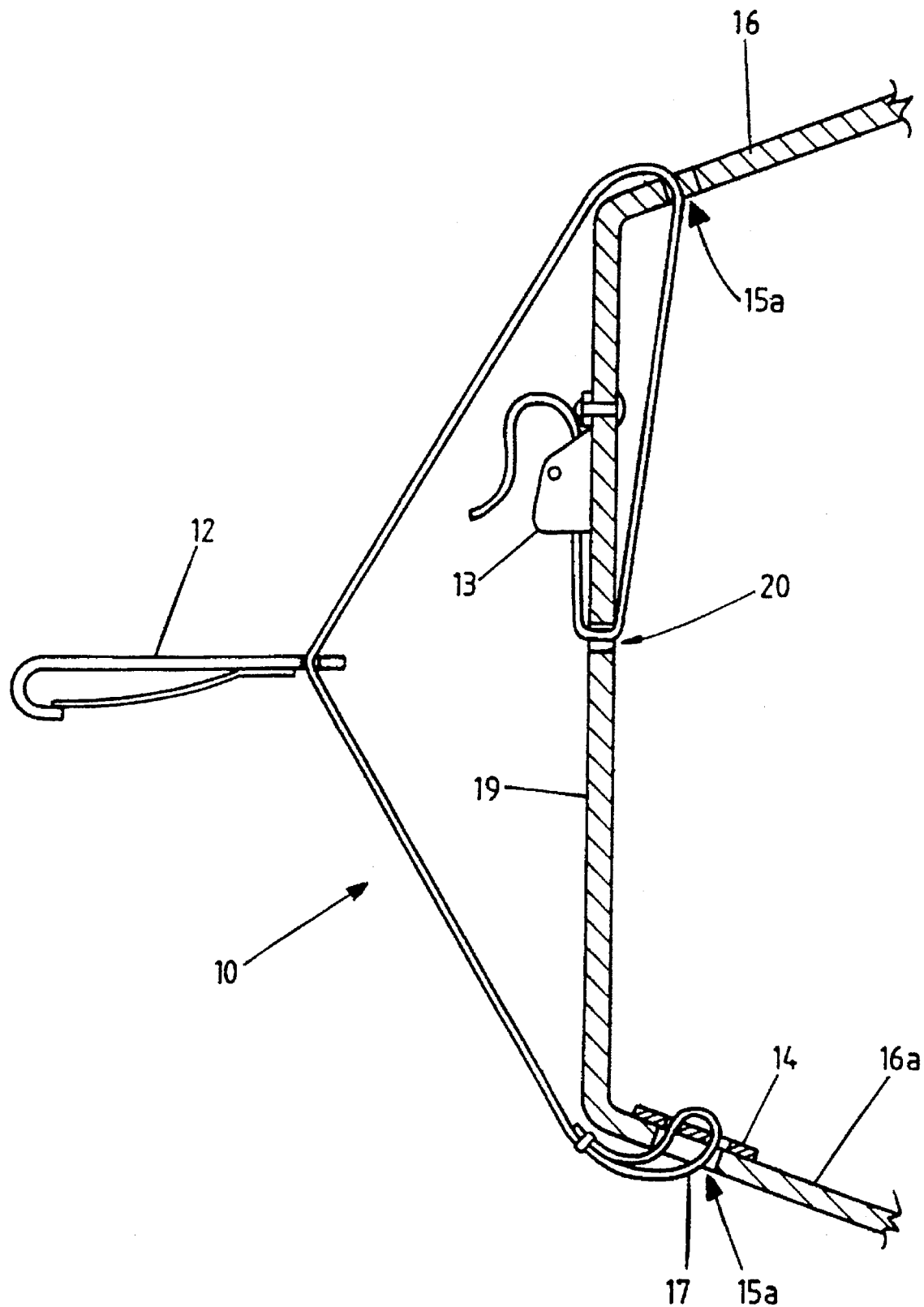

In the embodiment shown in FIG. 8, the adjustment means comprises a cam-type clamp adjuster 13 that is attached to the rear surface 19 of the safety seat 10. An aperture 20 is formed in the rear wall 19. The tether strap 11 extends from the adjuster 13 through the aperture 20, through aperture 15 in a side wall 16, and extends through a second aperture 15a in the opposite side wall 16a of the safety seat where a loop 17 is attached to a three bar slide 14. The three bar slide 14 abuts against the inside surface of the side wall 16a.

Figure 9:
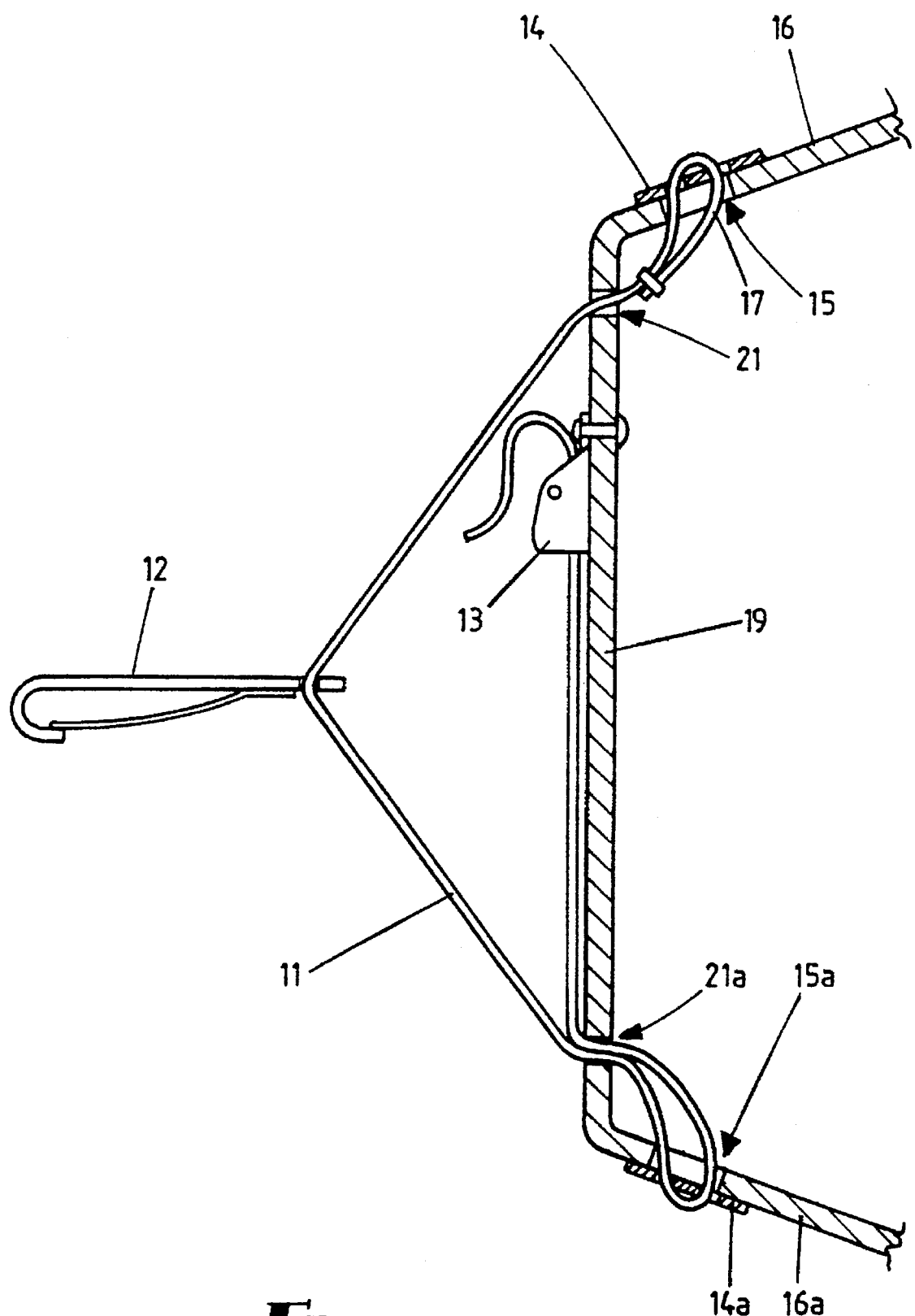

In the embodiment shown in FIG. 9, the tether strap 11 is positioned so that the three bar slides 14 and 14a are located on the outside surface of the side walls 16 and 16a. The adjustment means comprises a cam-type clamp adjuster 13 that is attached to the rear wall 19. The tether strap 11 extends from the adjuster 13 to an aperture 21 where a loop of the tether strap 11 is inserted through the apertures 21a and 15a, the end of the loop being attached to the three bar slide 14a. A loop 17 is formed in the end of the tether strap 11 and is located through a further aperture 21 in the rear wall 19 and in turn the loop 17 is attached to a three bar slide 14 and locates through an aperture 15.

Figure 10:
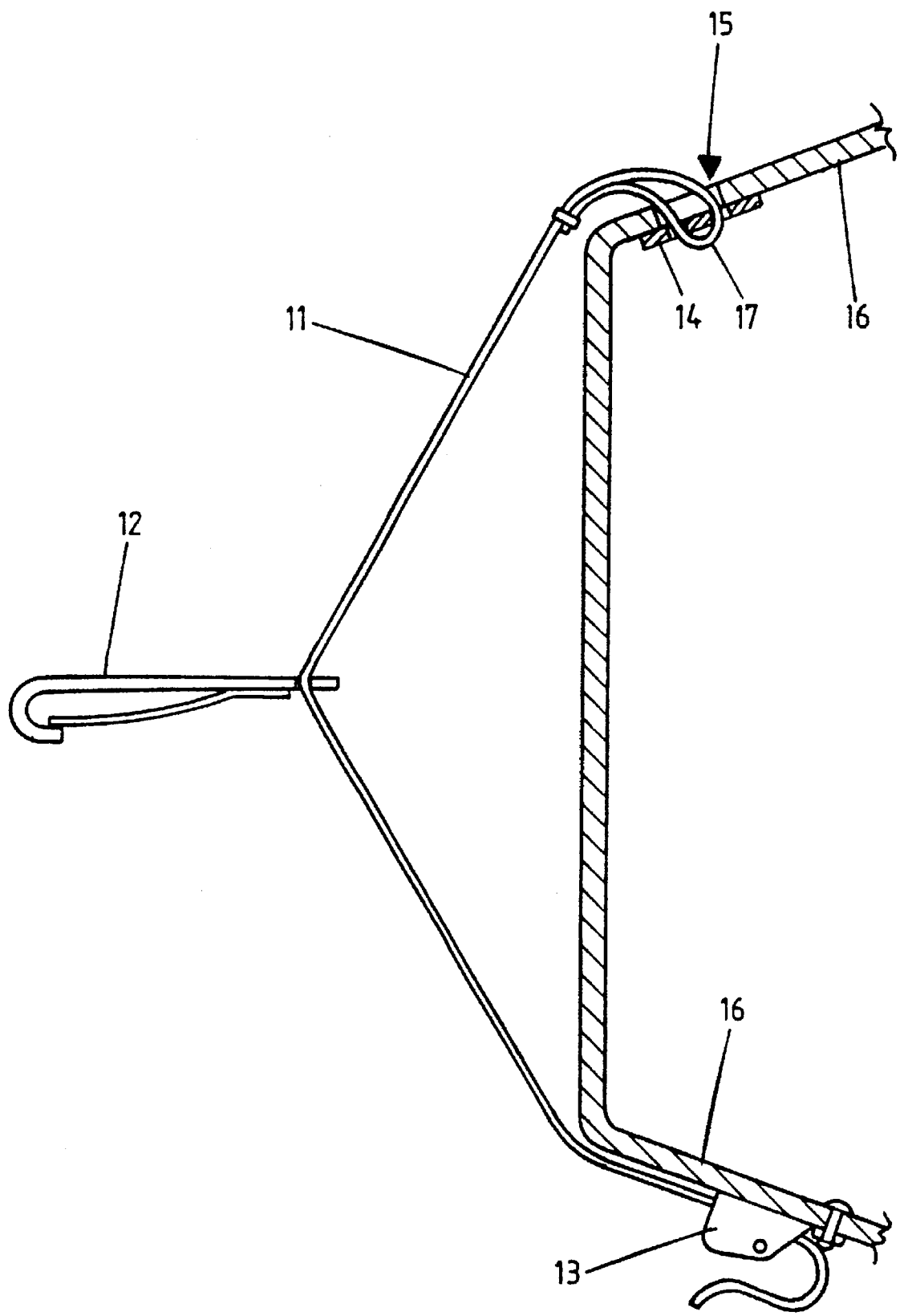

FIG. 10 shows an adjuster 13 which comprises a cam-type clamp secured to a side wall 16a and a loop 17 formed in the end of the tether strap 11 which locates through a three bar slide 14. The loop 17 extends through an aperture 15 and the three bar slide 14 abuts against an inside surface of the side wall 16.

Figure 11:
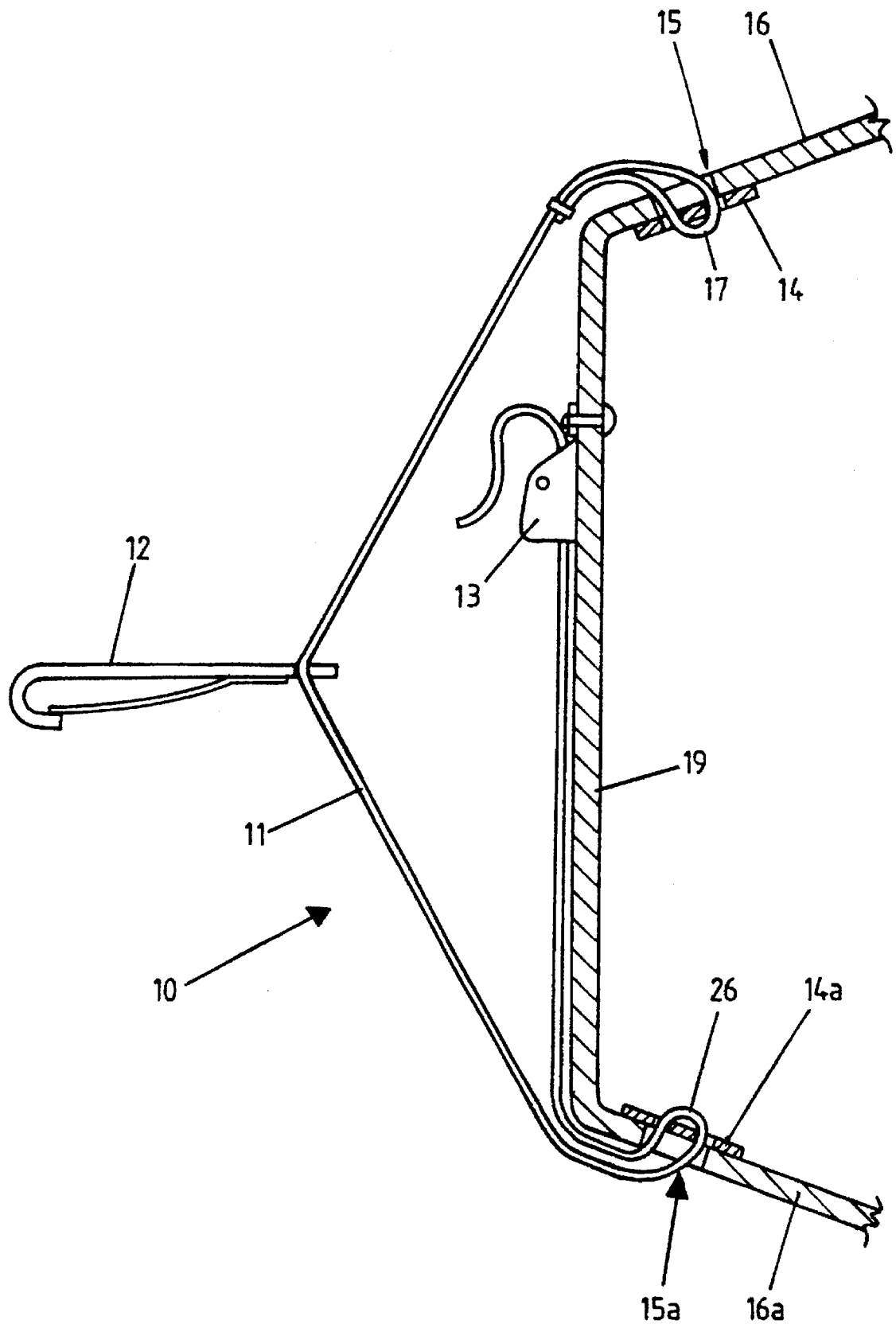

FIG. 11 shows an adjuster 13 attached to the rear wall 19 of the safety seat 10. The tether strap 11 extends from the adjuster 13 which is secured to the backrest 19 and comprises a cam-type adjuster. A looped portion 26 of the tether strap 11 extends through an aperture 15a. The looped portion 26 is attached to a three bar slide 14a which abuts against the inside surface of the side wall 16a. A loop 17 is formed on the end of the tether strap 11 that locates through aperture 15 and is attached to a three bar slide 14 that abuts against the inside surface of the side wall 16.

All of the embodiments described above have the advantage of the tether strap 11 being suitable for use in either the rear or forward facing seat. Clearly, there is an advantage in being able to simply pull the tether strap in the required position regardless of what direction the seat is facing. It should be realized that it will be possible to use other configurations which provide these same advantages.

We claim:

1. A safety seat, for use in a vehicle, comprising:

a seat portion, a backrest having a head end remote from said seat portion, first and second mutually spaced anchorage locations on said head end of said backrest, a connector for engagement with a securement point on said vehicle, said connector having a strap opening, a tether strap with one end extending from said first anchorage location, extending in a loop through said strap opening, with the other end extending to said second anchorage location, and adjustment means for adjusting the length of said tether strap loop.

2. A safety seat according to claim 1 wherein said safety seat further comprises side walls on each side of said backrest, said first anchorage location located in one of said side walls, and said second anchorage location located in the other said side wall.

3. A safety seat according to claim 2 wherein said first and second anchorage locations comprise apertures in said side walls, and said adjustment means comprises an in-line length adjuster located between said connector and one of said anchorage locations with the first end of said tether strap looping through one side of said in-line adjuster said safety seat further comprising a first three bar slide located over the aperture of said first anchorage location on the outside surface of said side wall, and a second three bar slide located over the aperture of said second anchorage location on the outside surface of said side wall, said tether strap, from said in-line adjuster, passing through said first three bar slide and respective aperture, passing through said aperture of said second anchorage location and through said second three bar slide, looping through another side of said in-line adjuster, passing back through said second three bar slide and respective aperture, and looping around a center bar of said first three bar slide, with the second end of said tether strap, extending from the center bar of said first three bar slide, secured to a centre bar of said second three bar slide.

4. A safety seat according to claim 2 wherein said first anchorage location and adjustment means comprises a cam-type clamp located on the outside surface of said side wall and said second anchorage location comprises an aperture in said side wall through which the ends of said tether strap locate and a three bar slide secured to an end of said tether strap that bears against the inside surface of side wall.

5. A safety seat according to claim 2 wherein said first and second anchorage locations comprise apertures in said side walls, and said adjustment means is located on the outside surface of said backrest with the first end of said tether strap secured thereto, said safety seat further comprising, a first three bar slide located over the aperture of said first anchorage location on the outside surface of said side wall, a second three bar slide located over the aperture of said second anchorage location on the outside surface of said side wall, and a pair of spaced apertures in said backrest, one adjacent said first anchorage location and one adjacent said second anchorage location, said tether strap, from said adjustment means, passing through said aperture in said backrest adjacent said first anchorage location, looping around a center bar of said first three bar slide, returning back through said aperture in said backrest adjacent said first anchorage location, passing through said strap opening in said connector, and passing through said aperture in said backrest adjacent said second anchorage location, with the second end of said tether strap secured to a center bar of said second three bar slide.

6. A safety seat according to claim 2 wherein said anchorage locations comprise:

apertures in said side walls through which the ends of said tether strap locate; and anchor plates, secured to the ends of said tether strap, that bear against an inside surface of each side wall.

7. A safety seat according to claim 6, wherein said anchor plates comprise a three bar slide.

8. A safety seat according to claim 2 wherein said anchorage locations comprise an aperture in each of said side walls through which the ends of said tether strap locate.

9. A safety seat according to claim 8 wherein said tether strap extends through the aperture of said first anchorage location, between the inside surfaces of said side walls and through the aperture of said second anchorage location.

10. A safety seat according to claim 9 wherein said adjustment means comprises an in-line length adjuster located between said connector and one of said anchorage locations.

11. A safety seat according to claim 8 wherein a first end of said tether strap is secured to a first three bar slide which bears against the inside surface of said side wall and the other end of said tether strap is looped through a second three bar slide so that the end of the tether strap passes back out of said aperture in said side wall and is secured to said adjustment means.

12. A safety seat according to claim 11 wherein said adjustment means comprises a cam-type clamp.

13. A safety seat according to claim 12 wherein said adjustment means is located on said side wall that is adjacent said other end of said tether strap.

14. A safety seat according to claim 11 wherein said adjustment means is located on the outside surface of said backrest.

15. A safety seat according to claim 11 further comprising a second strap, the ends of which are connected to said first and second three bar slides respectively so that said second strap extends between said first and second three bar slides.

16. A safety seat according to claim 15 wherein said adjustment means comprises a cam-type clamp.

17. A safety seat according to claim 8 wherein a first end of said tether strap is secured to a first three bar slide which bears against the inside surface of said side wall, and the other end of said tether strap passes through an aperture in said backrest and is secured to said adjustment means which is located on the outside surface of said backrest.

18. A safety seat according to claim 17 wherein said adjustment means comprises a cam-type clamp.

19. A safety seat according to claim 8, wherein said adjustment means comprises an in-line length adjuster located between said connector and one of said anchorage locations.

20. A safety seat according to claim 19, wherein said means for securing said tether strap comprise anchor plates secured to each end of said tether strap that bear against an inside surface of each side wall.

21. A safety seat, for use in a vehicle, comprising:

a seat portion, a backrest having a head end remote from said seat portion, a side wall on each side of said backrest, first and second mutually space anchorage locations on said side walls, each anchorage location comprising an aperture in said side walls, a connector for engagement with a securement point on said vehicle, said connector having a strap opening, a tether strap with a first end passing through said first anchorage location aperture, extending in a loop through said strap opening, with the other end of said tether strap passing through said second anchorage location aperture, means for securing said tether strap to said backrest and said side walls, and adjustment means for adjusting the length of a said tether strap loop.

22. A safety seat in combination with a vehicle, the vehicle having:

a vehicle seat having a seat back portion, and an anchorage point behind said seat back portion, the safety seat comprising;

a seat portion, a backrest having a head end remote from said seat portion, first and second mutually spaced anchorage locations on said head end of said backrest, a connector for engagement with a securement point on said vehicle, said connector having a strap opening, a tether strap with one end extending from said first anchorage location, extending in a loop through said strap opening, with the other end extending to said second anchorage location, and adjustment means for adjusting the length of said tether strap loop.

23. A safety seat, for use in a vehicle, comprising:

a seat portion, a backrest having a head end remote from said seat portion, a side wall on each side of said backrest, first and second mutually spaced anchorage locations on said side walls, each anchorage location comprising an aperture in each said side wall, a connector for engagement with a securement point on said vehicle, said connector having a strap opening, a tether strap having a first and a second end with one end of said tether strap extending from said first anchorage location, through said connector strap opening, to said second anchorage location, an in-line length adjuster located between said connector and one of said anchorage locations with the first end of said tether strap looping through one side of said in-line adjuster, a first three bar slide located over the aperture of said first anchorage location on the outside surface of said side wall, and a second three bar slide located over the aperture of said second anchorage location on the outside surface of said side wall, said tether strap, from said in-line adjuster, passing through the strap opening in said connector and through said first three bar slide and respective aperture, passing through said aperture of said second anchorage location and through said second three bar slide, looping through another side of said in-line adjuster, passing back through said second three bar slide and respective aperture, and looping around a center bar of said first three bar slide, with the second end of said tether strap, extending from the center bar of said first three bar slide, secured to a center bar of said second three bar slide.

24. A safety seat in combination with a vehicle, the vehicle having:

a vehicle seat having a seat back portion, and an anchorage point behind said seat back portion, the safety seat comprising:

a seat portion, a backrest having a head end remote from said seat portion, a side wall on each side of said backrest, first and second mutually spaced anchorage locations on said side walls, each anchorage location comprising an aperture in said side walls, a connector for engagement with a securement point on said vehicle, said connector having a strap opening, a tether strap with a first end passing through said first anchorage location aperture, extending in a loop through said strap opening, with the other end of said tether strap passing through said second anchorage location aperture, means for securing said tether strap with respect to said backrest and side walls, and adjustment means for adjusting the length of a said tether strap loop.

* * * * *